Aug. 1, 1961 W. L. MARSHALL ET AL 2,994,735
CONFORMABLE SPACER BLOCKS AND METHOD OF MAKING SAME
Filed June 8, 1959 2 Sheets-Sheet 1
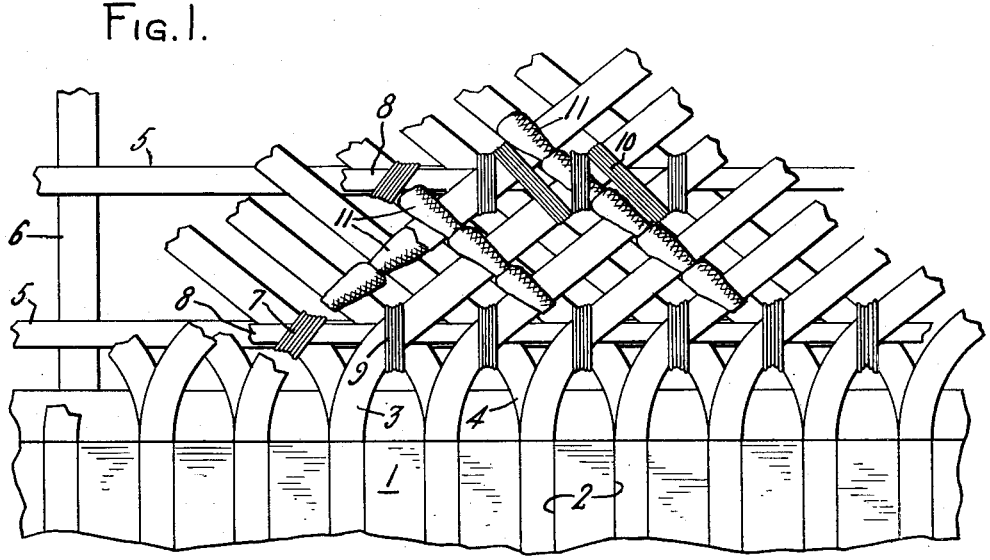
Fig. 1.
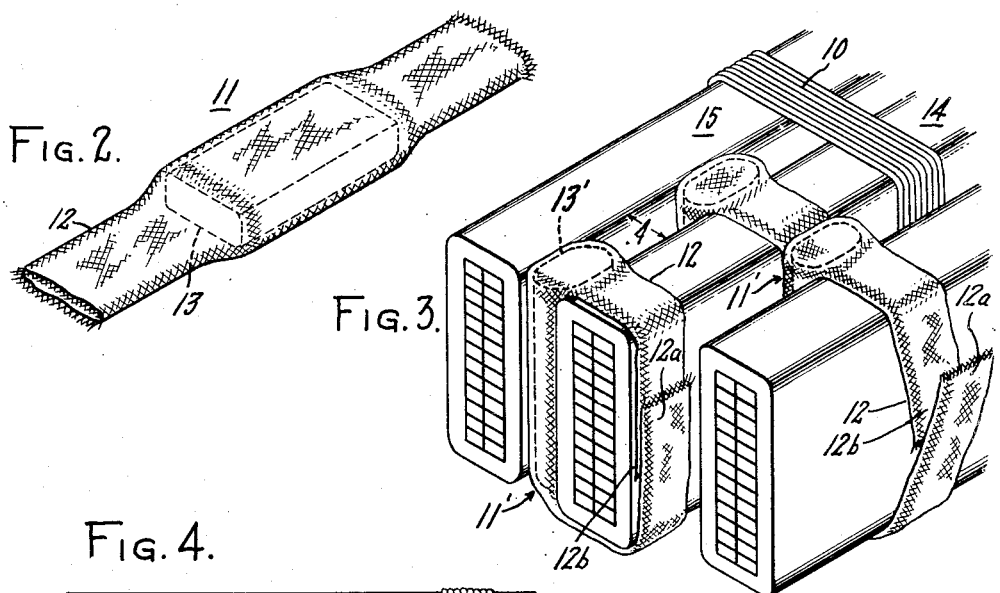
Fig. 2. Fig. 3.
Fig. 4.
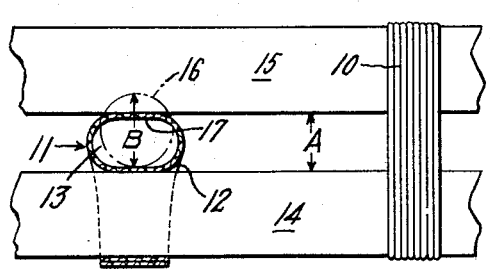
Inventors
Walter L. Marshall
Almy D. Coggeshall
by W. C. Crutcher
Their Attorney Aug. 1, 1961  W. L. MARSHALL ET AL  2,994,735
CONFORMABLE SPACER BLOCKS AND METHOD OF MAKING SAME
Filed June 8, 1959  2 Sheets-Sheet 2
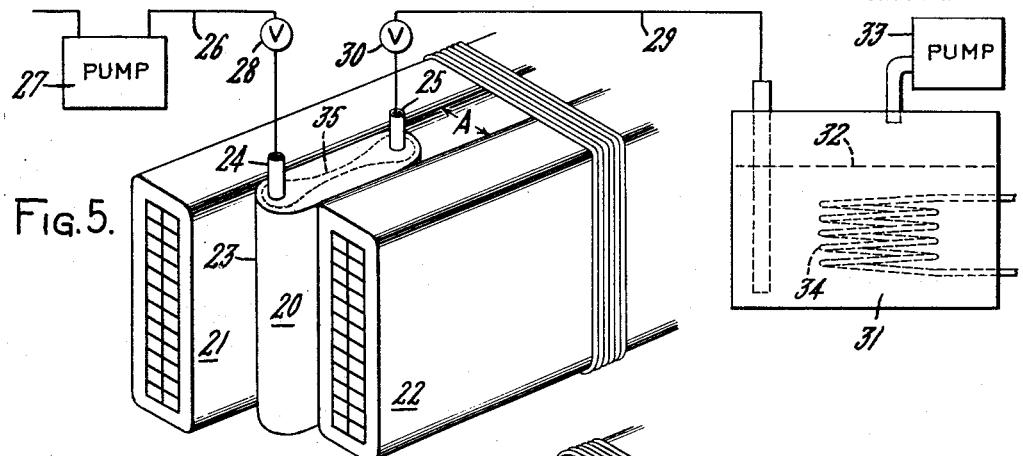
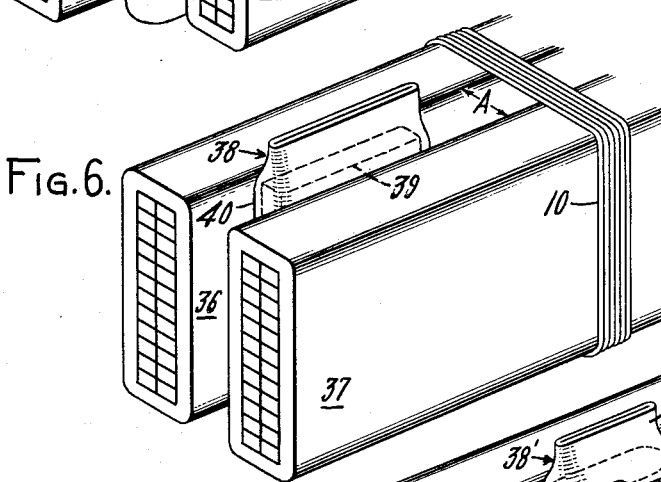
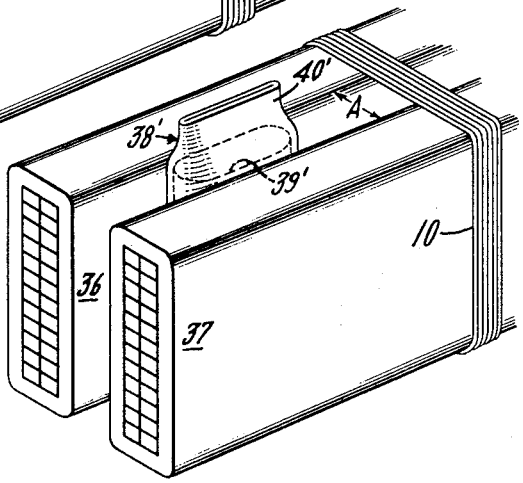
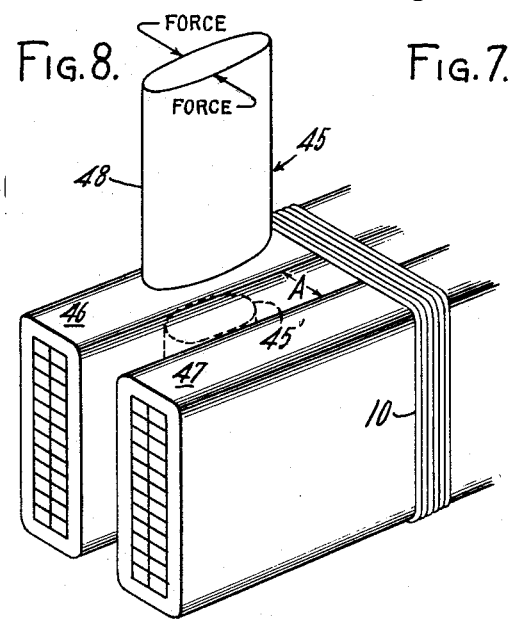
Inventors
Walter L. Marshall
Almy D. Coggeshall
by W. C. Crutcher
Their Attorney

United States Patent Office 2,994,735
Patented Aug. 1, 1961

2,994,735
CONFORMABLE SPACER BLOCKS AND METHOD OF MAKING SAME
Walter L. Marshall and Almy D. Coggeshall, Schenectady, N.Y., assignors to General Electric Company, a corporation of New York
Filed June 8, 1959, Ser. No. 818,879
10 Claims. (Cl. 174—138)

This invention relates to conformable spacer blocks and more particularly it relates to an improved conformable block for maintaining electrical conductors in proper spaced relation, as in the winding of an electromagnetic device such as a motor, generator, transformer, or like apparatus.

In many types of such electrical equipment, it is necessary to hold the electrical conductors in spaced relation with one another. Sometimes this is done for cooling purposes; other times to provide proper alignment for electrical connections, and very often this is done in order to tie the conductor bars together into a rigid structure which will be capable of withstanding mechanical or electrical forces which may be imposed upon it. In large electrical machinery, such as a turbine-generator, the conductor bars can be quite large and of substantial weight and are subjected to various forces during the operation of the machine. The spacer blocks used, in order to be effective, must fit the space to be filled with precision in order that there will be no looseness in the structure. A blocking arrangement for a generator stator is disclosed in the co-pending application of George M. Wolff, Serial No. 775,866, filed November 24, 1958, now abandoned, and assigned to the same assignee as this application.

With the newer types of "thermosetting" insulation, the conductor bar of a large electric generator will be quite hard and inflexible. Therefore, it is desirable to provide a spacing block which will "conform" during assembly to the space which it is later to maintain in operation instead of trying either to size the block carefully to the space by hand-fitting "cut and try" methods or by trying to move the conductor bars together after the block is inserted. The former approach is quite time consuming and the latter is difficult with conductor bars having thermosetting insulation since the cured bars have limited flexibility so that excessive movement may crack the insulation. Also, it may be noted that the wrapped insulation does not present a smooth surface but has slight irregularities which make it difficult to obtain a good fit consistently.

Accordingly, one object of the present invention is to provide an improved conformable spacer block particularly suited for a large generator stator winding.

Another object is to reduce the time required to fit spacing blocks between a number of large and relatively fixed bar members having surface irregularities.

A still further object is to provide an improved insulating compression block for transmitting transverse loading between adjacent large electrical conductor bars.

Another object is to standardize the size of spacer blocks so that only a single size need be used which will adapt itself to variations in the design dimension of the blocking opening.

Another object is to provide an improved blocking arrangement for accurately maintaining electrical conductors in a given spaced relationship, without expensive hand-fitting.

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 1 is a developed plan view of the end turn portion of a generator stator winding looking radially outward;
FIG. 2 is a perspective view of one type of improved conformable block in accordance with the invention;
FIG. 3 is a detailed perspective view of FIG. 1 showing the application of the conformable block of FIG. 2;
FIG. 4 is a plan view of a portion of FIG. 3;
FIG. 5 is a diagrammatic view of a modified form of the invention, illustrating the method of assembly;
FIGS. 6 and 7 are diagrammatic views of the steps in the assembly of a modification of the invention; and
FIG. 8 is a diagrammatic view of yet a third modification.

Generally stated, the invention is practiced by providing a flexible bag filled with a curable plastic, with means to cause the bag to tend to attain a circular shape while it is disposed between two conductor bar surfaces spaced by a distance less than the diameter of the circle which the conformable block would attain in transverse cross-section if it were unrestrained. The plastic is then caused to cure to a rigid mass to form a solid spacing block conforming exactly to the space between conductors.

Referring now to FIG. 1 of the drawing, there is seen a developed view looking radially outward from the interior of a large generator stator. The core 1 contains longitudinal slots 2 which contain top and bottom insulated conductor bars 3 and 4 respectively. Conductor bars 3 and 4 are bent to diverge from one another as shown to make the proper electrical connections. The bottom bars are lashed to hoop-like binding bands 5 which, in turn, are attached to support members 6. Resin impregnated cord is used for the lashing as seen at 7. The top bars 3 are separated from bottom bars 4 by hoop-like spacing strips 8 and are likewise lashed to the binding bands 5 by resin impregnated cord ties 9.

In addition to the top and bottom bars 3, 4 being lashed to the binding bands 5 by the ties 7, 9, the bars are lashed to one another by "chain ties" 10 which furnish means limiting the spacing between adjacent conductor bars to a predetermined distance and prevent the bars from spreading apart from one another.

Shown in position between bars are conformable blocks 11 which fill the space between bars and serve as lateral compression members to prevent any of the top or bottom bars from moving together toward an adjacent bar. The blocks 11 are arranged in line with one another so as to transmit the compressive load without deflecting the bars.

The structure and method of producing the conforming block 11 and its various modifications may be understood more clearly by reference to FIGS. 2, 3, and 4 in which a preferred embodiment of the invention is illustrated. FIG. 2 shows a conformable block assembly 11 prior to its application to a generator stator winding as comprising a flexible sleeve 12 and a rectangular block 13 contained therein of a thermosetting or other suitable type of plastic material. The sleeve 12 is a commercially obtainable woven material in which the strands composing the weave cross one another diagonally with respect to the axis of the sleeve, as shown in FIG. 2. Hence the braided sleeving has no fixed dimension as regards diameter and length because the angle of crossover of the braided strands is free to change. This characteristic of such a woven material is well known; and it will be understood that, by compressing the tube axially, it will encompass a large diameter cross-section; while by applying tension to the ends and stretching it axially, the sleeve will constrict to a smaller diameter and a transverse cross-section taken through the sleeve will contain less area than before.

The material from which the sleeving is woven is preferably a blend of glass fiber and Dacron, the latter being a synthetic fiber sold by E. I. du Pont de Nemours & Company. At elevated temperatures, between approximately 80° C. and 125° C., the Dacron will shrink to perform a function to be described later.

The rectangular block 13 is composed of a thermosetting plastic which is selected to have good dielectric properties and a high compressive strength after curing. Several such thermosetting plastics are commercially available, preferably selected from resins curing through the epoxy or unsaturated polyester groups. In the preferred embodiment shown, employing a Dacron-woven sleeve, it is preferred to employ an epoxy resin with a boron trifluoride amine complex curing system, due to the comparatively high curing temperature of this resin. Such a resin will readily cure to a rock-like hardness at temperatures in the neighborhood of 135° C. Such a resin is available commercially under the trade name "Epon 828" sold by the Shell Chemical Company and it is generally blended with reinforcing fillers such as asbestos, short glass fibers, certain clays and talcs, and combinations of the above, in order to give adequate compressive and impact strengths. The consistency of the thermosetting material chosen should be such that at room temperature it will maintain its shape but be a doughy putty-like mass which is deformable with moderate pressure.

The length of sleeving 12 is selected so that it will extend around the perimeter of the conductor bar and overlap. This may be seen by reference to FIG. 3 where the conformable block 11 is shown applied to a conductor bar 14, with the overlapping ends 12a and 12b of sleeve 12 falling on the front side of the conductor bar. A chain tie 10 is shown holding conductor bar 14 to an adjacent conductor bar 15 so as to limit the spacing of conductor bars 14, 15 to the lateral spacing identified A.

The method of application and operation of the conformable spacer block 11 will now be described. Since an axial stretching of the braided sleeve 12 will tend to constrict it into a shape having a circular cross-section of relatively small diameter, the pressure exerted by the sides of sleeve 12 on the deformable thermosetting block 13 contained therein will likewise tend to deform the rectangular cross-section of block 13 into a circular cross-section of the same diameter as the inside of sleeve 12.

The sleeve 12 containing block 13 is placed as shown on conductor bar 14 with the block lying between bar 14 and bar 15. Sleeve 12 is then manually stretched by pulling on the ends whereupon it will attempt to attain a circular shape having a diameter B as illustrated by phantom lines 16 in FIG. 4. Since chain tie 10, however, maintains the spacing between bars 14 and 15 to the dimension A, the sleeve-enclosed thermosetting block 13 will assume the flattened shape shown at 17. The flaps 12a, 12b of the sleeve are then lapped on the opposite side of the conductor bar and held in position while still under tension by suitable means such as an adhesive. A suitable adhesive for this purpose can be prepared from a high melting point thermoplastic material applied from a suitable solvent, for example, by using polyvinyl formal as the polymer and ethylene dichloride as the solvent, or a polycarbonate polymer such as Lexan and methylene chloride as a solvent. Alternatively a high tack nitrile rubber adhesive which may be compounded with thermosetting ingredients such as phenolic resins may be used. There is a wide choice of commercially obtainable adhesive compounds that may be used for this purpose, and a suitable selection and methods of application of same will be obvious to those skilled in the art.

After the generator stator has been completely lashed and blocked, proceeding from one conductor to the next, the entire assembly is heated in order to cure the thermosetting resin while tension is maintained longitudinally along the sleeves by the lapped and secured sleeve ends 12a, 12b. For the epoxy resin used in the preferred embodiment, the curing temperature is approximately 135° C., at which temperature the thermosetting plastic will cure to a hard rock-like substance having a relatively high compressive and impact strength and good dielectric qualities making it suitable for blocking.

During the heating to effect cure, there may be some conductor bar movement which will tend to realign the spacing slightly between conductor bars. This is compensated for by the fact that the Dacron in sleeve 12 also shrinks in the range between 80° C. and 125° C. This shrinkage causes the longitudinal tension previously applied to the sleeve during assembly to be augmented which, in turn, insures that each block 11 completely fills the space between conductor bars. It is preferred to select a thermosetting plastic which cures at a temperature higher than that at which the sleeving completes its shrinkage.

A modification of the block described in FIGS. 2–4 may be seen by reference to FIG. 5. There is illustrated in simple diagrammatic form a conformable block 20 in position between two adjacent conductor bars 21, 22. The block 20 consists of a closed flexible bag or bladder 23 with hose connections 24, 25. The bag 23 may be advantageously constructed of a variety of materials. For temperatures not to exceed 80° C. vinyl plastisols may be used to deposit a suitable bag structure on a forming tool. Alternatively, various rubber combinations may be used, for example, neoprene or butyl rubber. For very high temperature purposes, silicone rubber may be advantageously employed. It is, of course, obvious that the bag composition shall be compatible with the filling composition.

Connected to one of the hose connections 24 is a pipe 26 leading to a suitable means to produce a vacuum such as a pump 27 and this pipe 26 is fitted with a valve 28. Likewise, a pipe 29 controlled by valve 30 leads to a pressure tank 31 which contains liquid resin 32. The resin 32 is maintained under pressure by a pump 33 so that it will flow through pipe 29 into the bag 23 when valve 30 is opened.

The resin 32 is likewise a polymerizable material capable of being cured to a rigid mass without the application of external pressure or the release of volatile by-products. If catalytic curing is desired, suitable formulations may be prepared from unsaturated polyester resins activated by peroxide curing agents or by epoxide resins activated either with amine or acid anhydride type curing agents. These resins initially are viscous liquids in which are incorporated reinforcing inorganic fillers such as asbestos fibers, glass fibers, fibrous inorganic fillers such as Wolloastonite and various clays and talcs.

If temperature curing is desired, the resin can be chosen either to undergo thermosetting at room temperature or at an elevated temperature. If it is desired to individually cure blocks 20 at room temperature, the resin 32 must be kept at a low temperature in pressure tank 31 and suitable refrigerating coils 34 will be necessary.

If a room temperature setting composition is desired, curing of resins of the unsaturated polyester resin type may be initiated with the use of an organic cobalt salt, for example, cobalt naphthenate in combination with methyl ethyl ketone peroxide. If elevated temperature cure is desired, on the other hand, suitable curing agents are benzoyl peroxide, or tertiary butyl perbenzoate.

When room temperature cure is desired with resins of the epoxy type, triethylene tetramine may be blended with the composition immediately before use, whereas if a heat curing system is desired, triethanol amine may be substituted. All of the above formulations are in common use and various modifications of them are well known to those skilled in the art.

The operation of the conformable block as illustrated in FIG. 5 may be briefly described as follows. Valve 30 is first closed and valve 28 opened to allow vacuum pump 37 to evacuate the bag 23, whereupon it will collapse as indicated by phantom lines 35. The purpose of evacuating bag 23 is to eliminate any possibility of voids in the resin after the bag has been filled. Valve 28 is then closed and valve 30 opened whereupon the liquid resin 32 will flow through pipe 29 to completely fill bag 23. The previously accomplished vacuum in the bag insures void-free filling and lowers the required pressure supplied by pump 33, approximately 10 p.s.i. having been found sufficient. Valve 30 is then closed and hose connections 24 and 25 are disconnected from vacuum and filling lines 26, 29 respectively, and suitably sealed. The dimensions of the bag when in its fully filled condition are chosen so that its unrestrained circular cross-section will have a diameter exceeding the spacing A between bars 21, 22. Therefore, as the bag fills it will flatten as it encounters the walls of conductors 21, 22 much as the previously described block 11 shown in FIG. 4. Curing of a thermosetting resin then proceeds on a block-by-block basis if room temperature curing is desired or, alternatively, is accomplished by heating the entire stator assembly after blocking and lashing has been completed as previously described with the conformable block 11.

Referring now to FIGS. 6 and 7, there are illustrated diagrammatically the "before" and "after" conditions respectively of another modification of the invention. Reference numerals in FIG. 7 correspond with those in FIG. 6 with a "prime" mark added. Shown in position between conductor bars 36, 37 is a conformable block 38 in its uncured and unformed condition. Conformable block 38 consists of a rectangular or similar non-circular block of thermosetting plastic 39 enclosed in a heat-shrinkable membrane 40. Several materials are available to form the membrane 40, an important requirement being that membrane 40 completes its shrinkage before the thermosetting plastic block 39 reaches its cure temperature. One suitable combination of materials for conformable block 38 would be the previously described epoxy resin with a boron trifluoride-amine curing system and a sleeve containing Dacron fibers. A more suitable and less expensive combination, however, would consist of the following. Thermosetting block 39 is formed in a rectangular shape from an alkyd resin which is one of the polyester group of resins and which has been reinforced with clay and glass fiber. This resin is commercially obtainable under the trade name "Glaskyd 1901," manufactured by Perrysburg Laboratories. The membrane may be formed of material known to the trade as "Mylar," manufactured by E. I. du Pont de Nemours & Company. This has the required ability to shrink at elevated temperatures after it has been stretched at lower temperatures.

FIG. 7 shows the same conformable block 38' after shrinkage of the membrane, where it is seen that the block 38' has attained a partially circular cross-section to completely bridge the space A between conductor bars 36 and 37.

The operation of the block shown in FIGS. 6 and 7 is as follows. Upon gradually raising the temperature, the material of membrane 40 begins to shrink and the peripheral tension collapses the rectangular block 39, serving to cause the block to tend to assume a circular cross-section. Thus the ratio of hte surface area of the sleeve to the volume of plastic contained therein decreases. As before, the diameter of the circle which would be encompassed by the membrane after its unrestrained shrinkage is complete has been selected to exceed spacing A between conductor bars 36, 37. Therefore, as the shrinkage proceeds, block 38 extends completely across space A and flattens out as it engages the opposite walls of conductors 36, 37. On the completion of shrinkage, the thermosetting material composing block 39 is still in a plastic or deformable condition. As heating proceeds, however, block 39 cures to a hard mass, forming a compression member between the conductor bars which are restrained by chain ties 10.

Still another modification may be seen by reference to FIG. 8. There, conformable block 45 is shown in the position before being placed between conductor bars 46, 47, and the same block 45' is shown in final position between the conductor bars. Here, the plastic is contained in a stretchable or elastic membrane 48. This membrane is stretched or elongated at the time time when it is placed around the resin so that it will exert a uniform pressure on the resin and tend to deform it into a shape having a circular cross-section. As in previous examples, the diameter of the unrestrained circle is predetermined to exceed the spacing A between bars. The block deforms, within the capabiity of the elastic membrane, to a shape having a low ratio of membrane surface area to contained volume of plastic.

A suitable combination is a natural or synthetic rubber of high elongation stretched around a suitable low pressure molding compound. An example of such a molding compound is formed of an unsaturated polyester or alkyd resin combined with a small percentage of diallyl phthalate and a peroxide curing agent, such as benzoyl peroxide. Such a resinous material is blended with a large percentage of mineral filler such as clays and talcs and an appreciable proportion of fibrous reinforcement, for example short glass fibers and/or sisal. Such a composition is known to the reinforced plastics industry as a premix molding compound. In such a formulation it may be advantageous to refrain from the use of monomeric styrene as this material seriously swells and deteriorates certain rubbers.

The operation of the modification described in FIG. 8 is slightly different from previous modifications in that the block has already been allowed to attain a substantially circular shape before insertion, the stretched membrane exerting pressure on all sides of the resin. Moderate pressure, therefore, is exerted on opposite sides of block 45 to pinch it into an elliptical-shaped cross-section as shown by the "force" arrows in FIG. 8. Then it is inserted into the space between conductor bars 46, 47 and released. Depending upon the consistency of the resin and the elasticity of the membrane 48, the block shown as 45' will attempt to regain a circular cross-section (or minimum ratio of membrane surface to contained volume of plastic) and in so doing will press against the sides of conductor bars 46, 47 to flatten there. The elasticity of the membrane, of course, serves as the means to cause the block to tend to attain a circular cross-section. The resin is cured as before and may be thermosetting at room temperature or at elevated temperatures. If the resin selected is to cure at room temperatures, it must, of course, be kept refrigerated prior to the time of use.

It will be realized that all the foregoing modifications operate on the same principle. In every case, the conformable block is furnished with means to cause it to attain a shape having a circular cross-section with a diameter greater than the space between bars wherein it is placed. Curing is then accomplished at a predetermined time to cause the block to harden so that it will withstand compressive loading. The block may be caused to assume a circular cross-section by several methods. In the embodiment shown in FIGS. 2–4, the surface area of the enclosing sleeve is decreased by longitudinal stretching with the volume of contained material remaining constant, whereas in FIG. 5 the flexible bag maintains a relatively constant surface area but the volume of material is increased as the resin is pumped into the bag. In FIGS. 6 and 7 the surface of the bag shrinks over a constant contained volume and in FIG. 8, the ratio of surface area to volume is altered by pinching the block into an elliptical cross-section prior to insertion between bars. Thus in all the above modifications, the ratio of surface area of the enclosing sleeve to the enclosed volume has been decreased to cause the conformable block to attempt to attain a circular shape but to be flattened between conductors which are spaced too narrowly to accept its full diameter.

While there have been described herein a preferred embodiment and several modifications of the invention, it will be understood that various other modifications may be made. For example, the various modifications preferably utilize elongated blocks of cylindrical form. However, specific applications could well require blocks of spherical form. It is intended to cover in the appended claims such modifications which fall within the true spirit and scope of this invention.

What we claim as new and desire to secure by Letters Patent of the United States is:

1. A conformable spacer block for maintaining desired spacing between two adjacent bar members comprising a sleeve member substantially closed at its opposite ends, a quantity of deformable plastic material capable of being cured to a rigid mass disposed inside and contained by said sleeve member, said sleeve being made of flexible material so constructed as to be contractible transversely to decrease the ratio of the surface area of the sleeve member relative to the volume of the deformable plastic material, whereby the sleeve will cause the plastic to tend to assume a circular cross-section.

2. A conformable spacer block for maintaining desired spacing between adjacent bar members comprising a woven sleeve having strands crossing diagonally with respect to the axis of the sleeve, a quantity of thermosetting plastic having a non-circular cross-section contained within the sleeve, said plastic material including a thermosetting resin adapted to cure to a rigid mass at elevated temperatures, and means for holding the ends of the sleeve under tension about one of said adjacent bar members, whereby the diagonal strands will cause the sleeve to constrict transversely and tend to deform the plastic material to a circular cross-section.

3. The method of producing a blocking member for maintaining desired spacing between adjacent bar members comprising the steps of providing a sealed impervious flexible bag having at least one inlet and one outlet connection communicating with the interior thereof, positioning the bag between spaced bar members, evacuating the bag through the outlet connection while the inlet connection remains closed, filling the bag with the outlet connection closed by pumping into the bag through the inlet connection a liquid polymerizable resin capable of being cured to a rigid mass, whereby voids in the resin are reduced, closing the inlet connection, and causing the resin to cure to a rigid mass.

4. A conformable spacer for maintaining desired spacing between adjacent members comprising a substantially sealed flexible bag of heat-shrinkable membrane material, therebetween, a deformable mass of thermosetting plastic substantially filling and contained by the bag, said thermosetting resin curing at a temperature higher than that at which the shrinking of the bag material is substantially complete, whereby, upon application of heat, the bag will shrink and tend to deform the thermosetting plastic contained therein to a circular cross-section and the plastic will cure to a substantially rigid mass.

5. A conformable spacer for maintaining desired spacing between adjacent members comprising a pre-stretched sealed elastic bag, a quantity of plastic material capable of being cured to a rigid mass substantially filling and contained by said elastic sleeve tending to deform the plastic material to a circular cross-section, said plastic being deformable to a non-circular cross-section so that it can be placed between adjacent members and then released and allowed to tend to return to a shape having a substantially circular cross-section so as to press into firm contact with the adjacent members.

6. A conformable blocking arrangement for maintaining a desired spacing between two adjacent bar members comprising a flexible sleeve therebetween adapted to be closed off at its opposite ends, a quantity of deformable plastic material capable of being cured to a rigid mass substantially filling and contained by said sleeve, said sleeve being made of flexible material so constructed as to be contractible in a transverse direction, whereby the sleeve will tend to deform the thermosetting plastic to a circular cross-section greater than said desired spacing, and means limiting the spacing between the adjacent conductor bars to a distance which is less than the diameter of said cross-section circle, whereby the sleeve containing the plastic material will press into firm engagement with the bar members as said sleeve causes the plastic to tend to assume a circular cross-section.

7. A conformable blocking arrangement for maintaining a desired spacing between adjacent electrical conductor bars comprising a woven sleeve therebetween having strands crossing diagonally with respect to the axis of the sleeve, a quantity of thermosetting plastic contained within the sleeve, said thermosetting plastic having a non-circular cross-section and being composed of thermosetting resin adapted to cure to a rigid mass, first fastening means holding the opposite ends of the sleeve under tension between said conductor bars, whereby the diagonal strands will cause the sleeve to constrict transversely and tend to deform the plastic material therein to a circular cross-section, and second means limiting the spacing between said bars to a distance which is less than the diameter of said cross-section circle, whereby upon increasing temperature, the thermosetting plastic will cure to a rigid mass as the tension on the sleeve ends causes the sleeve to maintain firm engagement with the conductors.

8. A conformable blocking arrangement for maintaining a minimum desired spacing between adjacent bar members comprising a sealed flexible sleeve therebetween of heat-shrinkable membrane material, a mass of thermosetting plastic having a non-circular cross-section substantially filling and contained by said sleeve, said mass being composed of a thermosetting plastic which cures to a rigid mass at a temperature higher than that at which the shrinking of the sleeve material is substantially complete, whereby, upon application of heat, the sleeve will shrink to tend to deform the thermosetting plastic contained therein to a circular cross-section, and means limiting the maximum spacing between adjacent conductor bars to a distance less than the diameter of said cross-section circle.

9. A conformable blocking arrangement for maintaining a minimum spacing between adjacent bar members comprising a pre-stretched elastic sleeve therebetween, a deformable mass of thermosetting resin substantially filling and contained by said sleeve whereby the peripheral tension maintained by said elastic sleeve tends to constrict and deform said resin transversely to a circular cross-section, and means limiting the maximum spacing between adjacent conductor bars to a distance less than the diameter of said cross-section circle, whereby said sleeve may be deformed so it can be placed between adjacent conductor bars and allowed to press into firm contact with the conductor bars.

10. The method of providing a conformable block for maintaining desired spacing between adjacent bodies which comprises providing a flexible bag member substantially filled with a quantity of deformable plastic material capable of conversion to a substantially rigid mass, deforming the bag while the plastic material is in plastic condition to a flattened shape permitting placing of the bag in position between the adjacent bodies to be spaced and inserting the flattened bag between the adjacent bodies, causing the flexible bag to contract so as to tend to decrease the surface area thereof relative to the volume of the plastic material to cause the plastic material to tend to assume a circular cross-section and thereby firmly engage the adjacent bodies, and converting the plastic material to a substantially rigid mass.

References Cited in the file of this patent

UNITED STATES PATENTS

| | | |
|---|---|---|
| 2,602,829 | Fromm et al. | July 8, 1952 |
| 2,677,067 | Johnson et al. | Apr. 27, 1954 |
| 2,885,581 | Pileggi | May 5, 1959 |

FOREIGN PATENTS

| | | |
|---|---|---|
| 453,820 | Canada | Jan. 4, 1949 |